(12) United States Patent
Wan

(10) Patent No.: US 7,957,264 B2
(45) Date of Patent: Jun. 7, 2011

(54) METHOD AND DEVICE FOR ALLOCATING RADIO CONFIGURATION TYPES

(75) Inventor: Rong Wan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 739 days.

(21) Appl. No.: 11/961,745

(22) Filed: Dec. 20, 2007

(65) Prior Publication Data

US 2008/0101288 A1   May 1, 2008

Related U.S. Application Data

(63) Continuation of application No. PCT/CN2006/001490, filed on Jun. 28, 2006.

(30) Foreign Application Priority Data

Jun. 30, 2005   (CN) .......................... 2005 1 0080249

(51) Int. Cl.
   *H04J 11/00*   (2006.01)
   *H04B 7/216*   (2006.01)
(52) U.S. Cl. .......................... 370/209; 370/335; 370/342
(58) Field of Classification Search ........................ None
   See application file for complete search history.

(56) References Cited

U.S. PATENT DOCUMENTS 6,970,439 B2 *   11/2005   Bi et al. ........................ 370/329
2004/0160920 A1   8/2004   Bi et al.
2004/0192315 A1   9/2004   Li et al.
2006/0068789 A1 *   3/2006   Vannithamby et al. ........ 455/436
2006/0153140 A1 *   7/2006   Chiang et al. ................. 370/335

OTHER PUBLICATIONS

1st Office Action in corresponding Chinese Application No. 200510080249.9 (Dec. 21, 2007).
1st Office Action in corresponding Chinese Application No. 200680012400.8 (Sep. 3, 2010).
"TIA-EIA/IS-2000.5-A—Upper Layer (Layer 3) Signaling Standard for cdma2000 Standards for Spread Spectrum Systems," Mar. 2000. TIA-EIA Interim Standard, Telecommunications Industry Association, Arlington, Virginia.
"TIA-EIA/IS-2000.2-A—Physical Layer Standard for cdma2000 Standards for Spread Spectrum Systems," Mar. 2000, TIA-EIA Interim Standard, Telecommunications Industry Association, Arlington, Virginia.
Written Opinion of the International Searching Authority in corresponding PCT Application No. PCT/CN2006/001490 (Oct. 26, 2006).

* cited by examiner

*Primary Examiner* — Jianye Wu
(74) *Attorney, Agent, or Firm* — Leydig, Voit & Mayer, Ltd.

(57) ABSTRACT

A method and a device for allocating a radio configuration (RC) type are disclosed in the present invention. The method includes: predefining a first threshold value and a second threshold value; when a user initiate a call, calculating current utilization rate of power resource of a cell and comparing the current utilization rate of power resource with the first threshold value, and calculating current utilization rate of Walsh resource of the cell and comparing the current utilization rate of Walsh resource with the second threshold value; allocating an RC type to TCH (Traffic Channel) and SCH (Supplemental Channel) of forward channels of the call based on above comparison results. In the present invention, an RC type can be dynamically allocated based on the current resource limits of the system, thus improving the capacity of the system.

20 Claims, 2 Drawing Sheets

METHOD AND DEVICE FOR ALLOCATING RADIO CONFIGURATION TYPES

CROSS REFERENCE TO RELATED APPLICATIONS

This application is a continuation of International Application No. PCT/CN2006/001490, filed Jun. 28, 2006, which claims the priority of Chinese Application No. 200510080249.9, filed Jun. 30, 2005, the content of both of which is incorporated herein by reference.

FIELD OF THE INVENTION

The present invention relates to the field of wireless communication, and particularly to a method and a device for allocating a Radio Configuration (RC) type to forward channels when a user initiates a call.

BACKGROUND OF THE INVENTION

For CDMA 2000 1X system in the wireless communication field, most of voice calls and data service calls are in rate set 1 which has a basic rate of 9.6 kbps.

The forward channel of calls of rate set 1 in CDMA 2000 1X system includes Traffic Channel (TCH) and Supplemental Channel (SCH). The TCH includes Fundamental Channel (FCH) and Dedicated Control Channel (DCCH).

The radio configuration of forward channel includes two types: RC3 and RC4. With the same rate, the usage of Walsh resource by RC4 of forward channel is half of the usage of Walsh resource by RC3 of forward channel, thus leaving a bigger Walsh resource capacity. But on the other hand, RC3 achieves a higher spreading gain than RC4. Relatively speaking, RC3 can save power.

A comparison of effects of allocating RC3 and RC4 respectively to a forward channel is shown in the following table:

| Radio configuration type | Supported SCH rates, (unit: kbps) | Walsh Code with a basic rate | Code rate | Modulation mode | Eb/No demodulation threshold |
|---|---|---|---|---|---|
| RC3 | 9.6, 19.2, 38.4, 76.8, 153.6 | 64-order | 1/4 | Quaternary phase shift keying (QPSK) | Relatively low |
| RC4 | 9.6, 19.2, 38.4, 76.8, 153.6, 307.2 | 128-order | 1/2 | QPSK | 1~2 dB higher than RC3 |

Eb/No in the above table refers to Energy per bit/Noise spectral density.

Power resource and Walsh resource are two most important wireless resources in CDMA 2000 1X system and they are most likely to become limited resources due to the bottleneck effect. Whether the system is power resource limited or Walsh resource limited changes dynamically. Sometimes the system is power resource limited and sometimes the system is Walsh resource limited. Therefore, only when the usage of the two resources is balanced can the system capacity be maximized.

Allocation of RC types plays a vital role in balancing the two resources.

Allocation solution in prior art I:

Parameters are used to allocate RC types of forward channel for the 1X rate set 1 calls accessing the system. Either RC3 or RC4 is allocated. Every call accessing the system is fixedly allocated to a given RC type.

The inventor of the present invention finds that the disadvantages of the prior art I are as follows: (1) The given RC type may be incompatible to the current system resource limit, thus reducing the system capacity; (2) When the system resource limit changes, RC type allocation can not change correspondingly and the adaptability of the RC type allocation to the system is poor. As a result, reasonable and efficient usage of system resource may not be guaranteed.

Allocation solution in prior art II:

An RC type is fixedly allocated for a call type. Parameters are used to allocate RC types of forward channel respectively for 1X rate set 1 voice calls and data calls accessing the system.

Prior art II differs from prior art I in that RC types are respectively allocated for different call types. Because a data service call requires a large amount of Walsh resource, usually RC4 is more often allocated to the data service call.

Although in prior art II, corresponding RC types are allocated according to difference among resources occupied by different call types, due to dynamic change of the current system resource limit, prior art II has the same disadvantage as prior art I.

SUMMARY OF THE INVENTION

A method and a device for allocating a radio configuration (RC) type are provided according to embodiments of the present invention. In the embodiments, when a user initiates a call, the system can dynamically allocate an RC type to forward channels in accordance with current resource limits.

A method for allocating a radio configuration (RC) type according to an embodiment of the invention, includes pre-defining a first threshold value and a second threshold value and when a user initiates a call, the method further includes: calculating current utilization rate of power resource of a cell and comparing the current utilization rate of power resource with the first threshold value; calculating current utilization rate of Walsh resource of the cell and comparing the current utilization rate of Walsh resource with the second threshold value; and allocating an RC type corresponding to above comparison results to forward channels of the call.

The process of calculating the current utilization rate of power resource of the cell includes: obtaining, by a base station, power used by traffic channels of the cell; calculating a difference between total allowed rated power of the cell and power used by overhead channels of the cell; and taking a ratio of the power used by the traffic channels to the calculated difference as the current utilization rate of power resource of the cell.

The process of calculating the current utilization rate of Walsh resource of the cell includes: obtaining, by a base station, Walsh resource used by traffic channels of the cell; calculating a difference between allowed rated Walsh resource of the cell and Walsh resource used by overhead channels of the cell; and taking a ratio of the Walsh resource used by the traffic channels to calculated the difference as the current utilization rate of Walsh resource of the cell.

The process of allocating the RC type corresponding to the above comparison results includes: if the current utilization rate of power resource of the cell is greater than or equal to the first threshold value and the current utilization rate of Walsh resource of the cell is smaller than the second threshold value, allocating RC3 to the forward channels of the call; if the current utilization rate of power resource of the cell is smaller than the first threshold value and the current utilization rate of Walsh resource of the cell is smaller than the second threshold value, allocating RC3 or RC4 to the forward channels of the call; if the current utilization rate of power resource of the cell is smaller than the first threshold value and the current utilization rate of Walsh resource of the cell is greater than or equal to the second threshold value, allocating RC4 to the forward channels of the call; and if the current utilization rate of power resource of the cell is greater than or equal to the first threshold value and the current utilization rate of Walsh resource of the cell is greater than or equal to the second threshold value, determining whether or not the current utilization rate of power resource is greater than a sum of the current utilization rate of Walsh resource and a configuration parameter and if yes, allocating RC3 to the forward channels of the call, and otherwise, allocating RC4 to the forward channels of the call.

The configuration parameter is greater than or smaller than 0.

The cell is a cell with strongest pilot signal intensity in the active set of the call.

A method for allocating a radio configuration (RC) type to a traffic channel (TCH) and a supplemental channel (SCH) of forward channels according to another embodiment of the invention, wherein allocating the RC type to the TCH includes: calculating current utilization rate of power resource of a cell and comparing the current utilization rate of power resource with a predefined first threshold value; calculating current utilization rate of Walsh resource of the cell and comparing the current utilization rate of Walsh resource with a predefined second threshold value; and allocating the RC type corresponding to above comparison results to TCH of the forward channels of the call, and wherein allocating the RC type to the SCH includes: calculating a highest rate V3 allowed to be allocated to SCH when each cell in an active set of SCH is configured with RC3 and a highest rate V4 allowed to be allocated to SCH when each cell in the active set of SCH is configured with RC4; and comparing V3 and V4 and if V3 is greater than or equal to V4, allocating RC3 to SCH of the forward channels of the call, and otherwise, allocating RC4 to SCH of the forward channels of the call.

The process of calculating the current utilization rate of power resource of the cell includes: obtaining, by a base station, power used by traffic channels of the cell; calculating a difference between total allowed rated power of the cell and power used by overhead channels of the cell; and taking a ratio of the power used by the traffic channels to the difference as the current utilization rate of power resource of the cell.

The process of calculating the current utilization rate of Walsh resource of the cell includes: obtaining, by a base station, Walsh resource used by traffic channels of the cell, calculating a difference between allowed rated Walsh resource of the cell and Walsh resource used by overhead channels of the cell, and taking a ratio of the Walsh resource used by the traffic channels to the difference as the current utilization rate of Walsh resource of the cell.

The process of allocating the RC type corresponding to above comparison results includes: if the current utilization rate of power resource of the cell is greater than or equal to the first threshold value and the current utilization rate of Walsh resource of the cell is smaller than the second threshold value, allocating RC3 to TCH of the forward channels of the call; if the current utilization rate of power resource of the cell is smaller than the first threshold value and the current utilization rate of Walsh resource of the cell is smaller than the second threshold value, allocating RC3 or RC4 to TCH of the forward channels of the call; if the current utilization rate of power resource of the cell is smaller than the first threshold value and the current utilization rate of Walsh resource of the cell is greater than or equal to the second threshold value, allocating RC4 to TCH of the forward channels of the call; and if the current utilization rate of power resource of the cell is greater than or equal to the first threshold value and the current utilization rate of Walsh resource of the cell is greater than or equal to the second threshold value, determining whether or not the current utilization rate of power resource is greater than a sum of the current utilization rate of Walsh resource and a configuration parameter and if yes, allocating RC3 to TCH of the forward channel of the call, and otherwise, allocating RC4 to TCH of the forward channel of the call.

The configuration parameter is greater than or smaller than 0.

The process of obtaining the highest rate V3 includes: calculating highest rates allowed to be allocated to the SCH by current power when each cell in the active set of the SCH is configured with RC3 and determining a minimum value M in the highest rates, calculating highest rates allowed to be allocated to the SCH by current Walsh resource when each cell in the active set of the SCH is configured with RC3 and determining a minimum value N in the highest rates, and taking a smaller value of M and N as the highest rate V3.

The process of obtaining a highest rate V4 includes: calculating the highest rates allowed to be allocated to the SCH by current power when each cell in the active set of SCH is configured with RC4 and determining a minimum value X in the highest rates, calculating highest rates allowed to be allocated to the SCH by current Walsh resource when each cell in the active set of SCH is configured with RC4 and determining a minimum value Y in the highest rates, and taking a smaller value of X and Y as the highest rate V4.

A device for allocating a radio configuration (RC) type according to another embodiment of the invention, comprising: a current power resource utilization rate processing unit, adapted to calculate current utilization rate of power resource of a cell when a user initiates a call and compare the current utilization rate of power resource with a predefined first threshold value; a current Walsh resource utilization rate processing unit, adapted to calculate current utilization rate of Walsh resource of the cell when the user initiates the call and compare the current utilization rate of Walsh resource with a predefined second threshold value; and a radio configuration type processing unit, adapted to allocate an RC type corresponding to above comparison results to forward channels of the call.

The current power resource utilization rate processing unit includes: a current power resource utilization rate calculating unit, adapted to obtain power used by traffic channels in the cell, calculate a difference between total allowed rated power of the cell and power used by overhead channels of the cell, and take a ratio of the power used by the traffic channels to the difference as the current utilization rate of power resource; and a first comparison unit, adapted to compare the current utilization rate of power resource with the predefined first threshold value.

The current Walsh resource utilization rate processing unit includes: a current Walsh resource utilization rate obtaining unit, adapted to obtain Walsh resource used by traffic channels in the cell, calculate a difference between allowed rated Walsh resource of the cell and Walsh resource used by overhead channels of the cell, and take a ratio of the Walsh resource used by the traffic channels to the difference as the current utilization rate of Walsh resource; and a second comparison unit, adapted to compare the current utilization rate of Walsh resource with the predefined second threshold value.

The radio configuration type processing unit includes an RC3 allocating unit and an RC4 allocating unit, wherein if the current utilization rate of power resource of the cell is greater than or equal to the first threshold value and the current utilization rate of Walsh resource of the cell is smaller than the second threshold value, the RC3 allocating unit allocates RC3 to the forward channels of the call; if the current utilization rate of power resource of the cell is smaller than the first threshold value and the current utilization rate of Walsh resource of the cell is smaller than the second threshold value, the RC3 allocating unit or the RC4 allocating unit allocates RC3 or RC4 to the forward channels of the call; if the current utilization rate of power resource of the cell is smaller than the first threshold value and the current utilization rate of Walsh resource of the cell is greater than or equal to the second threshold value, the RC4 allocating unit allocates RC4 to the forward channels of the call; if the current utilization rate of power resource of the cell is greater than or equal to the first threshold value and the current utilization rate of Walsh resource of the cell is greater than or equal to the second threshold value, and the current utilization rate of power resource is greater than a sum of the current utilization rate of Walsh resource and a configuration parameter, the RC3 allocation unit allocates RC3 to the forward channels of the call; and if the current utilization rate of power resource of the cell is greater than or equal to the first threshold value and the current utilization rate of Walsh resource of the cell is greater than or equal to the second threshold value, and the current utilization rate of power resource is smaller than a sum of the current utilization rate of Walsh resource and a configuration parameter, the RC4 allocating unit allocates RC4 to the forward channel of the call.

The device is provided in a base station.

A device for allocating a radio configuration (RC) type according to another embodiment of the invention, comprising: an RC type allocating unit for TCH (Traffic Channel), adapted to calculate current utilization rate of power resource of a cell when a user initiates a call and compare the current utilization rate of power resource with a predefined first threshold value, calculate current utilization rate of Walsh resource of the cell and compare the current utilization rate of Walsh resource with a predefined second threshold value, and allocate an RC type corresponding to above comparison results to TCH of forward channels of the call; and an RC type allocating unit for SCH (Supplemental Channel), adapted to calculate a highest rate V3 allowed to be allocated to SCH when each cell in an active set of SCH is configured with RC3 and a highest rate V4 allowed to be allocated to SCH when each cell in the active set of SCH is configured with RC4, compare V3 and V4, and if V3 is greater than or equal to V4, allocate RC3 to SCH of the forward channels of the call, and otherwise, allocate RC4 to SCH of the forward channels of the call.

The RC type allocating unit for SCH includes: a highest rate V3 obtaining unit, adapted to calculate highest rates allowed to be allocated to SCH by current power when each cell in the active set of SCH is configured with RC3 and determine a minimum value M in the highest rates, calculate highest rates allowed to be allocated to SCH by current Walsh resource when each cell in the active set of SCH is configured with RC3 and determine a minimum value N in the highest rates, and take a smaller value of M and N as the highest rate V3.

The RC type allocating unit for SCH includes: a highest rate V4 obtaining unit, adapted to calculate highest rates allowed to be allocated to SCH by current power when each cell in the active set of SCH is configured with RC4 and determine a minimum value X in the highest rates, calculate highest rates allowed to be allocated to SCH by current Walsh resource when each cell in the active set of SCH is configured with RC4 and determine a minimum value Y in the highest rates, and take a smaller value of X and Y as the highest rate V4.

The device is provided in a base station.

One of the embodiments of the present invention has the following technical effects:

(1) the present invention dynamically allocates an RC type to forward channels according to resource limits, thus increasing forward access capacity of wireless systems and enhancing access success rate;

(2) the present invention enables SCH to obtain the highest rate eventually, and thereby increases throughput volume of service data;

(3) the present invention does not require maintenance personnel to manually configure or change an RC type, therefore reducing the difficulty of system maintenance and enhancing intelligence of system control.

DETAILED DESCRIPTION OF THE EMBODIMENTS

In some embodiments of the present invention, an RC type is dynamically allocated to TCH and SCH of forward channel according to power resource and Walsh resource limits of a cell. The detailed solution includes: setting a threshold value (a first threshold value) for utilization rate of power resource; when current utilization rate of power resource of the cell is greater than or equal to the first threshold value, judging the cell as power resource limited, and otherwise, judging the cell as not power resource limited; setting a threshold value (a second threshold value) for utilization rate of Walsh resource; when current utilization rate of Walsh resource of the cell is greater than or equal to the second threshold value, judging the cell as Walsh resource limited, and otherwise, judging the cell as not Walsh resource limited.

Figure 1:
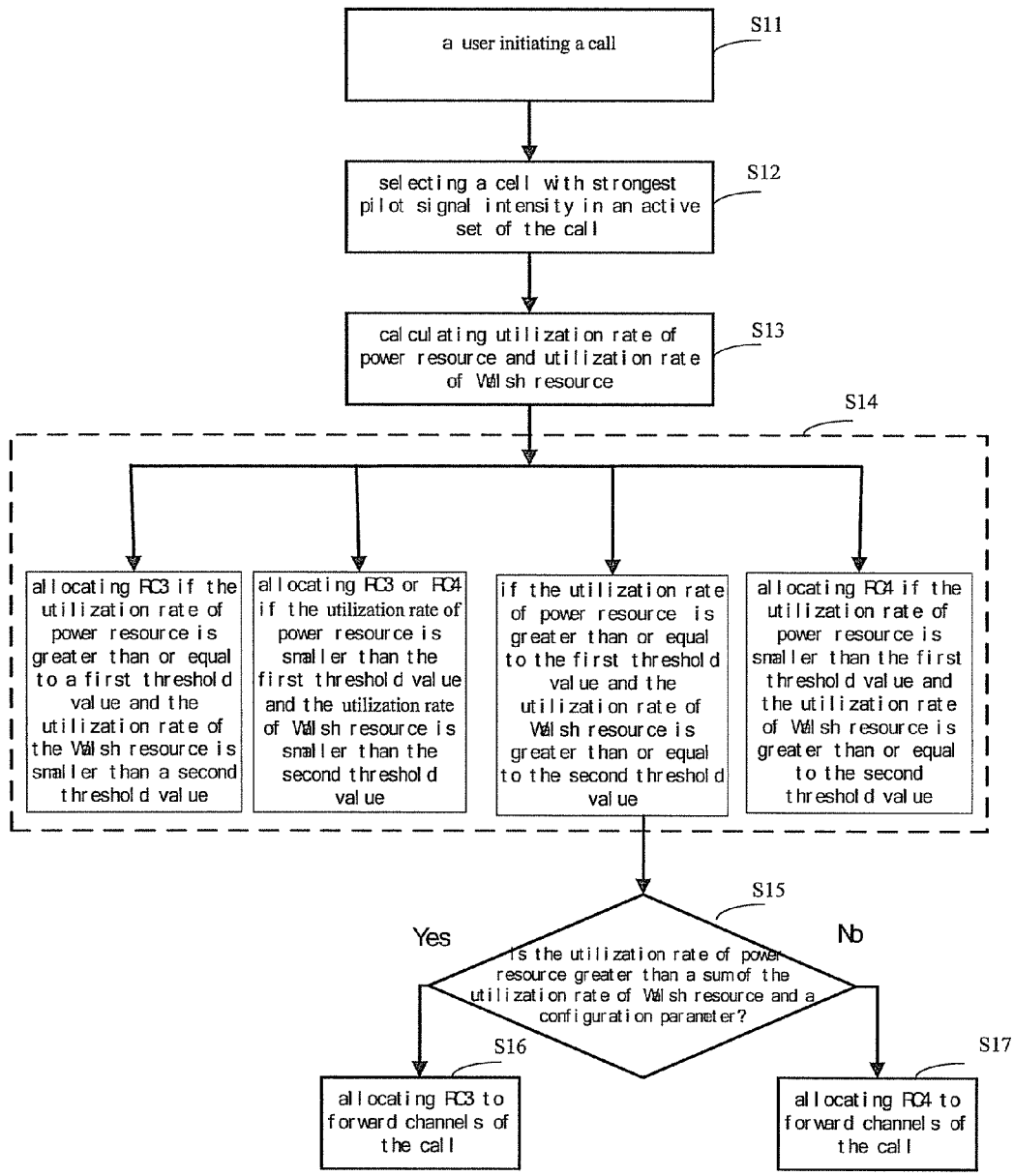
FIG. 1 is a flow chart illustrating an RC type allocation method according to an embodiment of the present invention.

When a user initiates a call, there are two methods as follows to allocate an RC type to forward channels (including TCH and SCH):

Method 1: The same strategy is adopted for allocating an RC type to TCH and SCH of forward channel. The detailed blocks are shown in FIG. 1 (taking CDMA 2000 1X system as example) and the blocks include:

Block S11: A CDMA 2000 1X user initiates a rate set 1 call to a base station;

Block S12: A base station controller selects a cell with the strongest pilot signal intensity from an active set of the call;

Block S13: The base station calculates utilization rate of power resource of the cell and utilization rate of Walsh resource of the cell from the cell with the strongest pilot signal intensity;

The utilization rate of power resource is calculated as follows.

The base station periodically measures power used by traffic channels of the cell, and obtains value of the power used by the traffic channels, calculates a difference between total allowed rated power of the cell and power used by overhead channels of the cell (this power value is relatively invariable) and takes a ratio of the power used by the traffic channels to the difference as the utilization rate of power resource;

The utilization rate of power resource is:

$$\frac{PowerUsedTraffic}{PowerTotal - PowerOverheadChan}$$

In the formula, PowerUsedTraffic is the power used by the traffic channels of the cell, PowerTotal is the total allowed rated power of the cell, and PowerOverheadChan is the power used by the overhead channels of the cell;

The utilization rate of Walsh resource is calculated as follows:

The base station periodically measures Walsh resource used by traffic channels of the cell, calculates difference between allowed rated Walsh resource of the cell and Walsh resource used by overhead channels of the cell and takes a ratio of the Walsh resource used by the traffic channels to the difference as the utilization rate of Walsh resource.

The utilization rate of Walsh resource $$\frac{\sum_{UsedTrafficChan} EquiWalsh}{128 - \sum_{OverheadChan} EquiWalsh}$$

In the formula, $$\sum_{UsedTrafficChan} EquiWalsh$$

is the Walsh resource used by the traffic channels of the cell, 128 is the total allowed Walsh resource of the cell, and $$\sum_{OverheadChan} EquiWalsh$$

is the Walsh resource used by the overhead channels of the cell. Here, the calculation of the amount of Walsh resource uses a 128-order code length as a normalization basis.

The correspondence between Walsh resource amount using 128-bit code length as a normalization basis and TCH & SCH is shown in the following table:

| RC type | Channel | 128-bit Walsh resource amount |
|---------|---------|-------------------------------|
| RC1     | TCH     | 2                             |
| RC2     | TCH     | 2                             |
| RC3     | TCH     | 2                             |
| RC4     | TCH     | 1                             |
| RC3     | SCH(nX) | 2*n                           |
| RC4     | SCH(nX) | n                             |

Block S14: Compare the calculated utilization rate of power resource with the first threshold value; compare the calculated utilization rate of Walsh resource with the second threshold value; there are four comparison results as follows:
(1) If the current utilization rate of power resource of the cell is greater than or equal to the first threshold value and the current utilization rate of Walsh resource of the cell is smaller than the second threshold value, the cell is considered as power resource limited and RC3 is allocated to forward channels (including TCH and SCH) of the call;
(2) If the current utilization rate of power resource of the cell is smaller than the first threshold value and the current utilization rate of Walsh resource of the cell is smaller than the second threshold value, the cell is considered as neither power resource limited nor Walsh resource limited and either RC3 or RC4 is allocated to forward channels (including TCH and SCH) of the call;
(3) If the current utilization rate of power resource of the cell is smaller than the first threshold value and the current utilization rate of Walsh resource of the cell is greater than or equal to the second threshold value, the cell is considered as Walsh resource limited and RC4 is allocated to forward channels (including TCH and SCH) of the call;
(4) If the current utilization rate of power resource of the cell is greater than or equal to the first threshold value and the current utilization rate of Walsh resource of the cell is greater than or equal to the second threshold value, the cell is considered as both power resource limited and Walsh resource limited and block S15 will be performed;

Block S15: Compare the current utilization rate of power resource with a sum of the current utilization rate of Walsh resource and a configuration parameter to see whether the current utilization rate of power resource is greater than the sum, $$\frac{PowerUsedTraffic}{PowerTotal - PowerOverheadChan} > \frac{\sum_{UsedTrafficChan} EquiWalsh}{128 - \sum_{OverheadChan} EquiWalsh} + Offset \quad (1)$$

In formula (1), Offset is a configuration parameter to control tendency of allocating RC3 or RC4; if Offset is greater than 0, RC3 tends to be allocated; if Offset is smaller than 0, RC4 tends to be allocated; If formula (1) is valid, the cell is determined as power resource limited and block S16 will be performed; otherwise block S17 will be performed;

Block S16: Allocate RC3 to the forward channels (including TCH and SCH) of the call;

Block S17: Allocate RC4 to the forward channels (including TCH and SCH) of the call.

In the above method, the same allocation strategy is adopted for both TCH and SCH of the forward channels. The RC type allocation of SCH also merely refers to the utilization rate of power resource and the utilization rate of Walsh resource. During the allocation of Walsh resource to high rate SCH in a practical application, it is required that there is continuously distributed unoccupied Walsh resource in code tree; however, there would be a case during the operation of network that the traffic is heavy and calls are initiated and released successively, thus generating Walsh resource fragments. Therefore, an embodiment of the present invention provides a method for allocating an RC type to SCH in order to obtain SCH soft handoff gain. In the method, resources of each soft handoff cell are balanced so as to enable SCH to get the highest rate.

Figure 2:
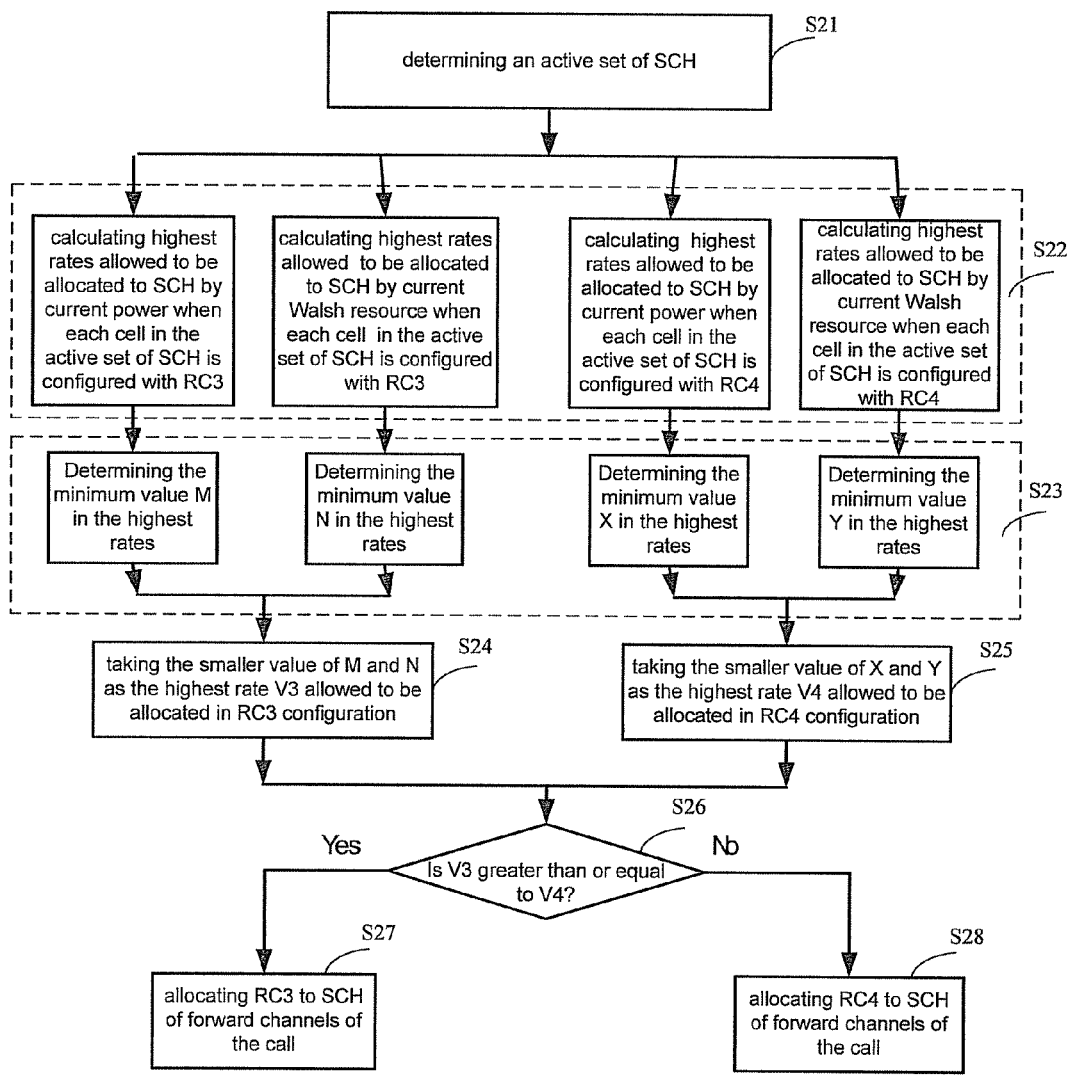
FIG. 2 is a flow chart illustrating an RC type allocation method for SCH according to an embodiment of the present invention.

Method 2: Different strategies are respectively adopted for allocating an RC type to TCH and SCH of forward channels. The method of allocating an RC type to TCH is the same as Method 1 and therefore detailed description is omitted. The method of allocating an RC type to SCH is showed in FIG. 2 and the method includes the following blocks:

Block S21: Determine an active set of SCH; the algorithm of determining an active set of SCH belongs to the prior art and therefore detailed description is omitted;

Block S22: Calculate the following four kinds of highest rates of SCH:

Kind 1: Calculate the highest rates allowed to be allocated to SCH by current power when each cell in the active set of SCH is configured with RC3;

Kind 2: Calculate the highest rates allowed to be allocated to SCH by current Walsh resource when each cell in the active set of SCH is configured with RC3;

Kind 3: Calculate the highest rates allowed to be allocated to SCH by current power when each cell in the active set of SCH is configured with RC4;

Kind 4: Calculate the highest rates allowed to be allocated to SCH by current Walsh resource when each cell in the active set of SCH is configured with RC4;

Block S23: Determine the minimum value respectively for the above four kinds of highest rates; assume that the minimum value of the highest rates of Kind 1 is M, the minimum value of the highest rates of Kind 2 is N, the minimum value of the highest rates of Kind 3 is X and the minimum value of the highest rates of Kind 4 is Y;

Block S24: Compare M and N and take the smaller of M and N as the highest rate V3 allowed to be allocated to SCH in the case of RC3 configuration; then perform block S26;

Block S25: Compare X and Y and take the smaller of X and Y as the highest rate V4 allowed to be allocated to SCH in the case of RC4 configuration; then perform block S26;

Block S26: Compare V3 and V4 and if V3 is greater than V4, perform Block S27, otherwise perform Block S28;

Block S27: Allocate RC3 to SCH of the forward channels of the call;

Block S28: Allocate RC4 to SCH of the forward channels of the call.

The method takes into fully consideration SCH resource in each soft handoff cell and enables SCH to get the highest rate eventually, thus effectively improving data service throughput.

A device for allocating a radio configuration type according a first embodiment of the present invention includes:

a current power resource utilization rate processing unit, adapted to calculate current utilization rate of power resource of a cell when a user initiates a call and compare the current utilization rate of power resource with a predefined first threshold value;

a current Walsh resource utilization rate processing unit, adapted to calculate current utilization rate of Walsh resource of the cell when the user initiates the call and compare the current utilization rate of Walsh resource with a predefined second threshold value; and a radio configuration type processing unit, adapted to allocate an RC type corresponding to above comparison results to forward channels of the call.

The current power resource utilization rate processing unit includes:

a current power resource utilization rate calculating unit, adapted to obtain power used by traffic channels of the cell, calculate a difference between total allowed rated power of the cell and power used by overhead channels of the cell, and take a ratio of the power used by the traffic channels to the calculated difference as the current utilization rate of power resource; and a first comparison unit, adapted to compare the current utilization rate of power resource with the predefined first threshold value.

The current Walsh resource utilization rate processing unit includes:

a current Walsh resource utilization rate obtaining unit, adapted to obtain Walsh resource used by traffic channels of the cell, calculate a difference between allowed rated Walsh resource of the cell and Walsh resource used by overhead channels of the cell, and take a ratio of the Walsh resource used by the traffic channels to the difference as the current utilization rate of Walsh resource; and a second comparison unit, adapted to compare the current utilization rate of Walsh resource with the predefined second threshold value.

The radio configuration type processing unit includes an RC3 allocating unit and an RC4 allocating unit, if the current utilization rate of power resource of the cell is greater than or equal to the first threshold value and the current utilization rate of Walsh resource of the cell is smaller than the second threshold value, the RC3 allocating unit allocates RC3 to the forward channels of the call;

if the current utilization rate of power resource of the cell is smaller than the first threshold value and the current utilization rate of Walsh resource of the cell is smaller than the second threshold value, the RC3 allocating unit or the RC4 allocating unit allocates RC3 or RC4 to the forward channels of the call;

if the current utilization rate of power resource of the cell is smaller than the first threshold value and the current utilization rate of Walsh resource of the cell is greater than or equal to the second threshold value, the RC4 allocating unit allocates RC4 to the forward channels of the call;

if the current utilization rate of power resource of the cell is greater than or equal to the first threshold value and the current utilization rate of Walsh resource of the cell is greater than or equal to the second threshold value, and the current utilization rate of power resource is greater than a sum of the current utilization rate of Walsh resource and a configuration parameter, the RC3 allocation unit allocates RC3 to the forward channels of the call;

if the current utilization rate of power resource of the cell is greater than or equal to the first threshold value and the current utilization rate of Walsh resource of the cell is greater than or equal to the second threshold value, and the current utilization rate of power resource is smaller than a sum of the current utilization rate of Walsh resource and a configuration parameter, the RC4 allocating unit allocates RC4 to the forward channels of the call.

The device for allocating a radio configuration type may be provided in a base station.

A device for allocating a radio configuration type according to a second embodiment of the present invention includes:

an RC type allocating unit for TCH, adapted to, when a user initiates a call, calculate current utilization rate of power resource of a cell and compare the current utilization rate of power resource with a predefined first threshold value, calculate current utilization rate of Walsh resource of the cell and compare the current utilization rate of Walsh resource with a predefined second threshold value, and allocate an RC type corresponding to above comparing results to TCH of forward channels of the call;

an RC type allocating unit for SCH, adapted to calculate a highest rate V3 allowed to be allocated to SCH when each cell in an active set of SCH is configured with RC3 and a highest rate V4 allowed to be allocated to SCH when each cell in the active set of SCH is configured with RC4, compare V3 and V4, and if V3 is greater than or equal to V4, allocate RC3 to SCH of the forward channels of the call, otherwise allocate RC4 to SCH of the forward channels of the call.

The RC type allocating unit for SCH includes: a highest rate V3 obtaining unit, adapted to calculate highest rates allowed to be allocated to SCH by current power when each cell in the active set of SCH is configured with RC3 and determine a minimum value M in the highest rates, calculate highest rates allowed to be allocated to SCH when each cell in the active set of SCH is configured with RC4 and determine a minimum value N in the highest rates, and take a smaller value of M and N as the highest rate V3.

The RC type allocating unit for SCH includes: a highest rate V4 obtaining unit, adapted to calculate highest rates allowed to be allocated to SCH by current power when each cell in the active set of SCH is configured with RC4 and determine a minimum value X in the highest rates, calculate highest rates allowed to be allocated to SCH when each cell in the active set of SCH is configured with RC4 and determine a minimum value Y in the highest rates, and take a smaller value of X and Y as the highest rate V4.

The device for allocating a radio configuration type may be provided in a base station.

Those skilled in the art should understand that the present invention can be applied not only to CDMA 2000 1x system, but also to other mobile communication systems based on physical layer technology of CDMA 2000 1X, including WLL and PTT etc.

It is obvious to those skilled in the art that various variations and modifications may be made to the present invention without departing from the spirit and scope of the present invention, and it is intended that the present invention covers these variations and modifications falling within the scope of the present invention as defined by the appended claims and their equivalents.

What is claimed is:

1. A method for allocating a radio configuration (RC) type, wherein a first threshold value and a second threshold value are predefined and when a user initiates a call, the method comprises:
    calculating current utilization rate of power resource of a cell and comparing the current utilization rate of power resource with the first threshold value;
    calculating current utilization rate of Walsh resource of the cell and comparing the current utilization rate of Walsh resource with the second threshold value; and
    allocating an RC type corresponding to above comparison results to forward channels of the call;
    wherein allocating the RC type corresponding to the above comparison results comprises:
    if the current utilization rate of power resource of the cell is greater than or equal to the first threshold value and the current utilization rate of Walsh resource of the cell is smaller than the second threshold value, allocating RC3 to the forward channels of the call;
    if the current utilization rate of power resource of the cell is smaller than the first threshold value and the current utilization rate of Walsh resource of the cell is smaller than the second threshold value, allocating RC3 or RC4 to the forward channels of the call;
    if the current utilization rate of power resource of the cell is smaller than the first threshold value and the current utilization rate of Walsh resource of the cell is greater than or equal to the second threshold value, allocating RC4 to the forward channels of the call; and
    if the current utilization rate of power resource of the cell is greater than or equal to the first threshold value and the current utilization rate of Walsh resource of the cell is greater than or equal to the second threshold value, determining whether or not the current utilization rate of power resource is greater than a sum of the current utilization rate of Walsh resource and a configuration parameter and if yes, allocating RC3 to the forward channels of the call, and otherwise, allocating RC4 to the forward channels of the call.

2. The method according to claim 1, wherein calculating the current utilization rate of power resource of the cell comprises:
    obtaining, by a base station, power used by traffic channels of the cell;
    calculating a difference between total allowed rated power of the cell and power used by overhead channels of the cell; and
    taking a ratio of the power used by the traffic channels to the calculated difference as the current utilization rate of power resource of the cell.

3. The method according to claim 1, wherein calculating the current utilization rate of Walsh resource of the cell comprises:
    obtaining, by a base station, Walsh resource used by traffic channels of the cell;
    calculating a difference between allowed rated Walsh resource of the cell and Walsh resource used by overhead channels of the cell; and
    taking a ratio of the Walsh resource used by the traffic channels to the calculated difference as the current utilization rate of Walsh resource of the cell.

4. The method according to claim 1, wherein the configuration parameter is greater than or smaller than 0.

5. The method according to any claim 1, wherein the cell is a cell with strongest pilot signal intensity in the active set of the call.

6. A method for allocating a radio configuration (RC) type to a traffic channel (TCH) and a supplemental channel (SCH) of forward channels, wherein allocating the RC type to the TCH comprises:
    calculating current utilization rate of power resource of a cell and comparing the current utilization rate of power resource with a predefined first threshold value;
    calculating current utilization rate of Walsh resource of the cell and comparing the current utilization rate of Walsh resource with a predefined second threshold value; and
    allocating the RC type corresponding to above comparison results to TCH of the forward channels of the call, and
wherein allocating the RC type to the SCH comprises:
    calculating a highest rate V3 allowed to be allocated to SCH when each cell in an active set of SCH is configured with RC3 and a highest rate V4 allowed to be allocated to SCH when each cell in the active set of SCH is configured with RC4; and
    comparing V3 and V4 and if V3 is greater than or equal to V4, allocating RC3 to SCH of the forward channels of the call, and otherwise, allocating RC4 to SCH of the forward channels of the call.

7. The method according to claim 6, wherein calculating the current utilization rate of power resource of the cell comprises:
    obtaining, by a base station, power used by traffic channels of the cell;
    calculating a difference between total allowed rated power of the cell and power used by overhead channels of the cell; and
    taking a ratio of the power used by the traffic channels to the difference as the current utilization rate of power resource of the cell.

8. The method according to claim 6, wherein calculating the current utilization rate of Walsh resource of the cell comprises:
- obtaining, by a base station, Walsh resource used by traffic channels of the cell;
- calculating a difference between allowed rated Walsh resource of the cell and Walsh resource used by overhead channels of the cell; and
- taking a ratio of the Walsh resource used by the traffic channel to the difference as the current utilization rate of Walsh resource of the cell.

9. The method according to claim 6, wherein allocating the RC type corresponding to above comparison results comprises:
- if the current utilization rate of power resource of the cell is greater than or equal to the first threshold value and the current utilization rate of Walsh resource of the cell is smaller than the second threshold value, allocating RC3 to TCH of the forward channels of the call;
- if the current utilization rate of power resource of the cell is smaller than the first threshold value and the current utilization rate of Walsh resource of the cell is smaller than the second threshold value, allocating RC3 or RC4 to TCH of the forward channels of the call;
- if the current utilization rate of power resource of the cell is smaller than the first threshold value and the current utilization rate of Walsh resource of the cell is greater than or equal to the second threshold value, allocating RC4 to TCH of the forward channels of the call; and
- if the current utilization rate of power resource of the cell is greater than or equal to the first threshold value and the current utilization rate of Walsh resource of the cell is greater than or equal to the second threshold value, determining whether or not the current utilization rate of power resource is greater than a sum of the current utilization rate of Walsh resource and a configuration parameter and if yes, allocating RC3 to TCH of the forward channels of the call, and otherwise, allocating RC4 to TCH of the forward channels of the call.

10. The method according to claim 9, wherein the configruation parameter is greater than or smaller than 0.

11. The method according to claim 6, wherein calculating the highest rate V3 comprises:
- calculating highest rates allowed to be allocated to the SCH by current power when each cell in the active set of the SCH is configured with RC3 and determining a minimum value M in the highest rates;
- calculating highest rates allowed to be allocated to the SCH by current Walsh resource when each cell in the active set of the SCH is configured with RC3 and determining a minimum value N in the highest rates; and
- taking a smaller value of M and N as the highest rate V3.

12. The method according to claim 6, wherein calculating the highest rate V4 comprises:
- calculating highest rates allowed to be allocated to the SCH by current power when each cell in the active set of SCH is configured with RC4 and determining a minimum value X in the highest rates;
- calculating highest rates allowed to be allocated to the SCH by current Walsh resource when each cell in the active set of SCH is configured with RC4 and determining a minimum value Y in the highest rates; and
- taking a smaller value of X and Y as the highest rate V4.

13. A device for allocating a radio configuration (RC) type, comprising:
- a current power resource utilization rate processing unit, adapted to calculate current utilization rate of power resource of a cell when a user initiates a call and compare the current utilization rate of power resource with a predefined first threshold value;
- a current Walsh resource utilization rate processing unit, adapted to calculate current utilization rate of Walsh resource of the cell when the user initiates the call and compare the current utilization rate of Walsh resource with a predefined second threshold value; and
- a radio configuration type processing unit, adapted to allocate an RC type corresponding to above comparison results to forward channels of the call;
- wherein the radio configuration type processing unit comprises an RC3 allocating unit and an RC4 allocating unit, wherein
- if the current utilization rate of power resource of the cell is greater than or equal to the first threshold value and the current utilization rate of Walsh resource of the cell is smaller than the second threshold value, the RC3 allocating unit allocates RC3 to the forward channels of the call;
- if the current utilization rate of power resource of the cell is smaller than the first threshold value and the current utilization rate of Walsh resource of the cell is smaller than the second threshold value, the RC3 allocating unit or the RC4 allocating unit allocates RC3 or RC4 to the forward channels of the call;
- if the current utilization rate of power resource of the cell is smaller than the first threshold value and the current utilization rate of Walsh resource of the cell is greater than or equal to the second threshold value, the RC4 allocating unit allocates RC4 to the forward channels of the call;
- if the current utilization rate of power resource of the cell is greater than or equal to the first threshold value and the current utilization rate of Walsh resource of the cell is greater than or equal to the second threshold value, and the current utilization rate of power resource is greater than a sum of the current utilization rate of Walsh resource and a configuration parameter, the RC3 allocation unit allocates RC3 to the forward channels of the call; and
- if the current utilization rate of power resource of the cell is greater than or equal to the first threshold value and the current utilization rate of Walsh resource of the cell is greater than or equal to the second threshold value, and the current utilization rate of power resource is smaller than a sum of the current utilization rate of Walsh resource and a configuration parameter, the RC4 allocating unit allocates RC4 to the forward channel of the call.

14. The device according to claim 13, wherein the current power resource utilization rate processing unit comprises:
- a current power resource utilization rate calculating unit, adapted to obtain power used by traffic channels in the cell, calculate a difference between total allowed rated power of the cell and power used by overhead channels of the cell, and take a ratio of the power used by the traffic channels to the difference as the current utilization rate of power resource; and
- a first comparison unit, adapted to compare the current utilization rate of power resource with the predefined first threshold value.

15. The device according to claim 13, wherein the current Walsh resource utilization rate processing unit comprises:
- a current Walsh resource utilization rate obtaining unit, adatped to obtain Walsh resource used by traffic channels in the cell, calculate a difference between allowed rated Walsh resource of the cell and Walsh reource used by overhead channels of the cell, and take a ratio of the Walsh reource used by the traffic channels to the difference as the current utilization rate of Walsh resource; and a second comparison unit, adapted to compare the current utilization rate of Walsh resource with the predefined second threshold value.

16. The device according to claim 13, wherein the device is provided in a base station.

17. A device for allocating a radio configuration (RC) type, comprising:

an RC type allocating unit for TCH (Traffic Channel), adapted to calculate current utilization rate of power resource of a cell when a user initiates a call and compare the current utilization rate of power resource with a predefined first threshold value, calculate current utilization rate of Walsh resource of the cell and compare the current utilization rate of Walsh resource with a predefined second threshold value, and allocate an RC type corresponding to above comparison results to TCH of forward channels of the call; and an RC type allocating unit for SCH (Supplemental Channel), adapted to calculate a highest rate V3 allowed to be allocated to SCH when each cell in an active set of SCH is configured with RC3 and a highest rate V4 allowed to be allocated to SCH when each cell in the active set of SCH is configured with RC4, compare V3 and V4, and if V3 is greater than or equal to V4, allocate RC3 to SCH of the forward channels of the call, and otherwise, allocate RC4 to SCH of the forward channels of the call.

18. The device according to claim 17, wherein the RC type allocating unit for SCH comprises: a highest rate V3 obtaining unit, adapted to calculate highest rates allowed to be allocated to SCH by current power when each cell in the active set of SCH is configured with RC3 and determine a minimum value M in the highest rates, calculate highest rates allowed to be allocated to SCH by current Walsh resource when each cell in the active set of SCH is configured with RC3 and determine a minimum value N in the highest rates, and take a smaller value of M and N as the highest rate V3.

19. The device according to claim 17, wherein the RC type allocating unit for SCH comprises: a highest rate V4 obtaining unit, adapted to calculate highest rates allowed to be allocated to SCH by current power when each cell in the active set of SCH is configured with RC4 and determine a minimum value X in the highest rates, calculate highest rates allowed to be allocated to SCH by current Walsh resource when each cell in the active set of SCH is configured with RC4 and determine a minimum value Y in the highest rates, and take a smaller value of X and Y as the highest rate V4.

20. The device according to claim 17, wherein the device is provided in a base station.

* * * * *